Aug. 26, 1924.
Re. 15,900
A. HETZNER
TOY AMUSEMENT APPARATUS
Original Filed Feb. 27, 1922
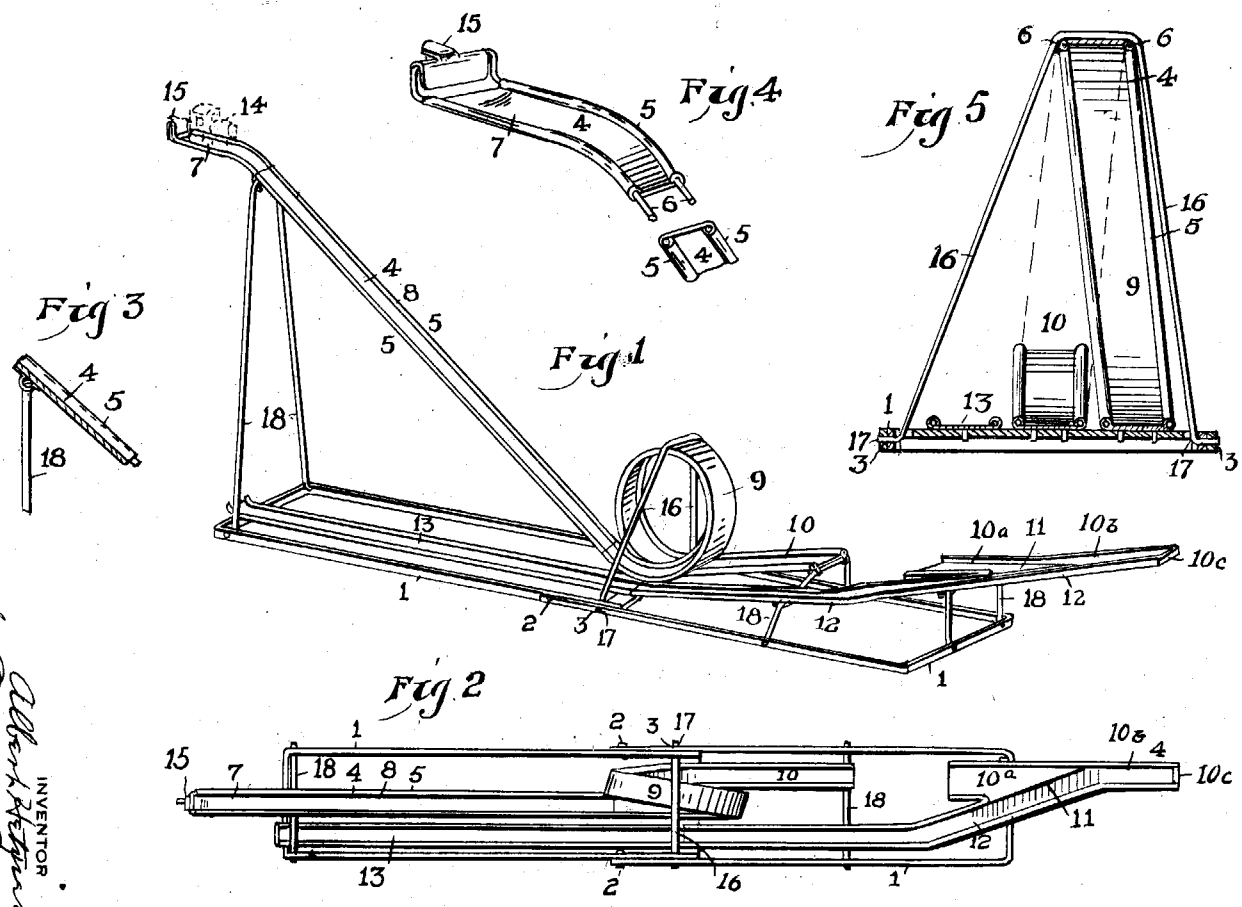
INVENTOR
Albert Hetzner.
by Edward A. Laurence
his attorney Reissued Aug. 26, 1924. Re. 15,900

UNITED STATES PATENT OFFICE.

ALBERT HETZNER, OF CHICAGO, ILLINOIS, ASSIGNOR TO BENJAMIN F. BAIN, OF PITTSBURGH, PENNSYLVANIA.

TOY AMUSEMENT APPARATUS.

Original No. 1,431,398, dated October 10, 1922, Serial No. 539,612, filed February 27, 1922. Application for reissue filed February 26, 1924. Serial No. 695,365.

*To all whom it may concern:*

Be it known that I, ALBERT HETZNER, a citizen of the United States of America, residing at Chicago, in the county of Cook and State of Illinois, have invented certain new and useful Improvements in Toy Amusement Apparatus, of which the following is a specification.

This invention relates to that class of toys in which a car or the like has rapid downward travel in a track of a tortuous or curved formation, and has for its objects:—

To provide a structural formation and combination of parts whereby a sectional and folding structure is provided capable of ready assemblage, disassemblage and compact storage when not required for use, and with which an effective connection and bracing of the parts is attained in the assembled condition thereof.

To provide a simple switch-back construction of the track portion of the structure whereby an automatic return of the car is effected in an efficient manner.

To provide a structural track formation adapted to provide a cheap and durable construction with which the ends of the sections of track are readily and securely connected together, all as will hereinafter more fully appear.

In the accompanying drawing:

Fig. 1, is a perspective view illustrating the general arrangement of parts in the present improvement and in an assembled condition ready for use.

Fig. 2, is a top view of the same.

Fig. 3, is a detail vertical section of the track and its folding brace.

Fig. 4, is an enlarged detail perspective view of the starting trigger at one end of the track.

Fig. 5, is an enlarged transverse sectional elevation on a plane cutting the center of the circular loop portion of the track.

Like reference numerals indicate like parts in the several views.

Referring to the drawing, 1 designates the supporting base, preferably of the rectangular sectional plate metal form shown, with the side rails thereof formed into a plurality of two or more sections, adapted to be secured together as a single rigid base structure by means of overlapping ends having aligned lateral pins and orifices 2, and with aligned orifices 3 adapted to receive in a detachable manner the laterally bent lower ends of the central track brace hereinafter described.

4 designates the sectional main track of the inclined and tortuous formation hereinafter described, and formed of strips of sheet metal the margins of which are formed with rolls or beads 5 which embrace wire cores 6 to constitute a double line of railway rails as shown. In the sectional formation of the present improvement, the wire core 6 is omitted from one end of a track section to leave a tubular recess, and the wire cores 6 project from the adjacent end of another track section, so that with the insertion of the described projecting portions of the cores into the bore of the roll or bead 5 of the other section, a simple, substantial and detachable connection of the parts is attained as illustrated more particularly in Fig. 4.

The sectional track 4 of the present invention is of following character.

7 is an elevated horizontal starting platform. 8 is an extended inclined portion, descending from the platform 7 to a point adjacent to the mid-length of the base. 9 is a helically arranged circular loop portion detachably connected to the lower end of the inclined portion 8 in a manner hereinafter described, with its track rails arranged in the interior of the loop portion. 10 and $10^a$ represent a pair of track portions in spaced or gapped relation to each other, and inclined reversely to the incline of the portion 8. The track portion 10 is connected to the adjacent end of the loop portion 9 to receive the travelling car therefrom. The track portion $10^a$ forms the ingress or admission track of the automatic switch-back which serves to reverse the direction of the car's travel.

The switch-back comprises the ingress track $10^a$, the spur $10^b$, with the inclined, lateral offset 11 interposed between the ingress track and the spur, and the egress track or downwardly inclined branch 12. The outer end of the spur track $10^b$ is provided with an upturned flange or bumper $10^c$ against which the car strikes and which serves to halt and reverse the direction of the travel of the car; so that after the car enters the spur by the ingress track, it leaves the spur by the egress track. The switching of the car to the egress track 12 is caused by the offset 11 which prevents the car reentering the ingress track $10^a$. This offset is shown provided by the difference in levels at the point of juncture of the ingress track and the spur, the former being at somewhat higher elevation, thus forming a shoulder over which the entering car jumps and which defines the side of the egress track 12 so that the returning car is switched or diverted into the latter.

13 is an approximately horizontal track portion, in aligned relation to the egress track 12 of the switch-back, and detachably connected to the latter in the manner already described. The track portions 12 and 13 form the low-level return track for the automatic delivery of the toy car 14, or other travelling element, to a point beneath the starting platform 7, so that the car may be lifted from the end of the low-level return track and replaced on the starting platform 7.

15 designates a pivoted trigger plate mounted transversely at an end of the platform 7 and adapted to provide means, under the control of the operator, for giving a more or less energetic starting push to the car 14 in starting the same in its travel upon the track 4. With the described construction the extended inclined portion 8 of the track is adapted to impart added momentum to the car 14 sufficient to carry the same around the circular loop portion 9 and onto the track portion 10. The momentum of the car causes it to jump the gap between the track portions 10 and $10^a$ and to travel up the track portion $10^a$ to the spur $10^b$ wherein its direction of travel is reversed, causing the car to pass down along the low-level return formed by the track portions 12 and 13 to the front of the toy beneath the starting platform 7.

16 designates an arched brace of wire, the apex of which has detachable connection with the crown of the loop portion 9, with the lower ends of its spreading arms formed with laterally extending prongs or bends 17 adapted to engage in the heretofore described aligned orifices 3 of the overlapping side rails of the sectional base 1 to secure the parts together in assembled relation.

18 designates a series of braces or supports of a V or arched shape hinged to different portions of track 4 and having at their lower ends prongs or bends adapted to engage in orifices formed therefor in the bars or plates which constitute the base 1 of the apparatus.

Having thus fully described my invention, what I claim as new and desire to secure by Letters Patent, is:—

1. In an amusement apparatus, the combination of a sectional track adapted to support a moving car and formed with an aligned starting platform, a main inclined portion, an intermediate loop portion and secondary inclined portions, a supporting base formed in sections having overlapping ends, lateral stud and orifice connections for said ends, and an arched brace engaging the crown of the loop portion of the track and having prongs at its lower ends for engagement in aligned orifices in the overlapping ends of the track sections.

2. In an amusement apparatus, the combination of a track adapted to support a moving car and formed with an aligned starting platform, a main inclined portion, an intermediate loop portion, and secondary inclined portions, said track comprising sections of sheet metal having folded margins enclosing wire cores and constituting the side rails of the track, and a base supporting track.

3. In an amusement apparatus, the combination of a track adapted to support a moving car and formed with an aligned starting platform, a main inclined portion, an intermediate loop portion, and secondary inclined portions, said track comprising sections of sheet metal having folded margins enclosing wire cores and constituting the side rails of the track, the end of one track section having its cores removed to provide receiving sockets and the end of an adjacent track section having its wire cores projecting to engage in said sockets, and a base supporting the track.

4. In an amusement apparatus, the combination of a track adapted to support a moving car and formed with an aligned starting platform, a main inclined portion, an intermediate loop portion, and secondary inclined portions having at a remote end an inclined offset, a return track comprising a downwardly inclined and aligned horizontal portion, and a base supporting the tracks.

5. In an amusement apparatus, the combination of a track adapted to support a moving car and formed with an aligned starting platform, a main inclined portion, an intermediate loop portion, and secondary inclined portions separated by a gap, the remote end of one of said secondary inclined portions having an inclined offset, a return track comprising a downwardly inclined and aligned horizontal portion, and a base supporting said tracks.

6. In an amusement apparatus, the combination of a track adapted to support a moving car and formed with an aligned starting platform, a main inclined portion, an intermediate loop portion, and secondary inclined portions, a plurality of arched braces pivotally connected to said track with their lower ends formed with lateral prongs, and a supporting base formed for detachable engagement with said prongs.

7. In a mechanical toy, a track structure adapted for the support of a travelling object and comprising an inclined main track down which the object travels, a helical loop track connected to the lower end of the inclined track, a low-level return track, and automatic means for switching the travelling object to the low-level return track after it has traversed the helical loop track.

8. In a mechanical toy, a track structure adapted for the support of a travelling object and comprising an inclined main track down which the object travels, a jump-gap connected with the lower end of the inclined track, a low-level return track, and automatic means for switching the travelling object to the low-level return track after it has traversed the jump-gap.

9. In a mechanical toy, a track structure for the support of a travelling object and comprising an inclined main track down which the object travels, a helical loop-track and a jump-gap connected with the lower end of the inclined track, a low-level return track, and automatic means for switching the car to the low-level return track after it has traversed the jump-gap and helical loop-track.

10. In a mechanical toy characterized by a track structure for the support of a travelling object, a switch-back for the track comprising a single-track spur upon which the travel of the object is reversed, an ingress track and an egress track forming branches of said spur, and fixed switching means whereby a travelling object entering the spur from the ingress track is on its return travel automatically diverted to the egress track.

11. In a mechanical toy characterized by a track structure for the support of a travelling object, a switch-back for the track structure comprising a single-track spur upon which the travel of the object is reversed, an ingress track and an egress track forming branches of said spur, and an offset between the ingress track and the spur over which the entering car passes and which diverts the car on its return travel to the egress track.

12. In a mechanical toy characterized by a track structure for the support of a travelling object, a switch-back for the track structure comprising a single-track spur upon which the travel of the object is reversed, an ingress track and an egress track forming branches of said spur, and a descending offset at the spur end of the ingress track over which the entering object passes and which diverts the object on its return travel to the egress track.

Signed at Chicago, Illinois, this 15th day of February, 1924.

ALBERT HETZNER.